United States Patent [19]
Offt et al.

[11] Patent Number: 4,744,664
[45] Date of Patent: May 17, 1988

[54] METHOD AND APPARATUS FOR DETERMINING THE POSITION OF A FEATURE OF AN OBJECT

[75] Inventors: Alan M. Offt, Clifton Park; Robert L. Jackson, Jr., Schenectady; Russell P. Kraft, Averill Park; John F. Wagner, Guilderland, all of N.Y.

[73] Assignee: Mechanical Technology Incorporated, Latham, N.Y.

[21] Appl. No.: 870,233

[22] Filed: Jun. 3, 1986

[51] Int. Cl.$^4$ .............................................. G01B 11/00
[52] U.S. Cl. .................... 356/375; 358/101; 356/376
[58] Field of Search ............... 356/372, 375, 376, 152; 250/561; 901/47; 358/101, 107; 364/559, 561

[56] References Cited

U.S. PATENT DOCUMENTS 4,136,957 1/1979 Uno et al. ........................... 356/375
4,508,452 4/1985 Di Matteo et al. ................. 356/376

Primary Examiner—F. L. Evans
Attorney, Agent, or Firm—Joseph V. Claeys; Joseph C. Sullivan

[57] ABSTRACT

A system for locating a feature of an object disposed in a frame includes a spot projector for projecting a spot in the general vicinity of the feature and an imaging device with a limited field of view. The spot projector is a precision device which projects the spot towards a preselected location on the frame. When the spot and the feature are in the field of view of the imaging device, the absolute location of the feature is determined from its selective distance to the spot. Provisions are also made for determining depth or relief information about the object.

10 Claims, 4 Drawing Sheets

METHOD AND APPARATUS FOR DETERMINING THE POSITION OF A FEATURE OF AN OBJECT

BACKGROUND OF THE INVENTION a. Field of Invention

This invention discloses a method and device for determining the exact position of an object within a field of view, for the operation of robots.

b. Description of the Prior Art

There is currently a strong impetus to design and manufacture robots capable of complex manipulations of various objects. A prime requisite for such a robot is accurate information regarding the exact position of the object being manipulated within a reference frame because without this information the robot cannot perform its designated tasks. Encoder systems integral with the robot mechanisms and various imaging devices such as video cameras have been used for this purpose. Both approaches have limitations. For example, the encoder approach is subject to errors due to loading of the robot structure. Also, in video approaches frequently there is a trade-off between the available field of view and resolution. Thus, for example, a video camera with a capability to produce 512×512 pixels and a resolution of 0.002" has a one inch x one inch field of view.

OBJECTIVES AND SUMMRY OF THE INVENTION

An objective of the present invention is to provide a method of determining the position of a feature of an object by repositioning a video camera thereby eliminating the need of several cameras.

Another objective is to provide a single position determining method which may be easily incorporated into several robotic operations such as qualifying (or recognizing) parts, qualifying particular features on a part, locating a base sheet on a fixture, locating subassembly parts on a base sheet and locating an assembly for riveting.

A further objective is to provide a method which may be easily adopted to three dimensional analysis.

Other objectives and advantages of the invention shall become apparent from the following description of the invention.

In accordance with the present invention, a video camera is positioned with its field of view generally covering a part or a feature of a part disposed on a reference plane. A source of light, preferably a laser, is also directed to form a light pattern on the part within the field of view of the camera. For simplicity of description this light pattern will also be referred to hereinafter by the more specific term "spot." The exact position of the spot is known with great accuracy, and therefore the absolute position of the part or its feature is determined by measuring the relative distance between the part to the spot as seen by the camera.

A second laser spot from a different angle may be used to make measurements when the first laser is occluded. The two laser sources may alternately be used to derive the depth (or profile) of the part.

DETAILED DESCRIPTION OF THE INVENTION

Figure 1:
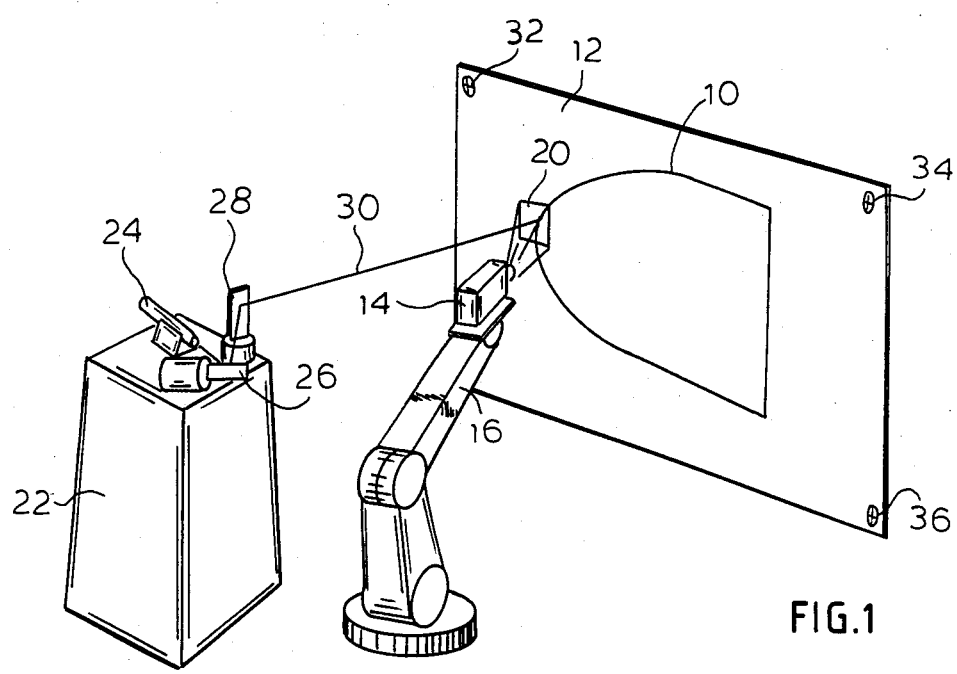
FIG. 1 shows the elements of a preferred embodiment of an apparatus for determining the position of an object constructed in accordance with the invention.

In FIG. 1, an object 10 is secured to frame 12 to determine the exact location of a particular feature of the object. For this purpose there is provided a video camera 14 mounted on a robotic arm 16 adapted to point the camera toward any portion of the surface 12 under the direction of a microprocessor-based control panel 18. (The electrical connections to the control panel are omitted for the sake of clarity.) Control elements are generally available which can direct the camera towards any portion of the frame 12 with an accuracy of about ¼ inch. In FIG. 1 camera 20 is pointed so that it can view a rectangular portion 20 of the object 10.

There is also provided a pedestal 22 which carries a laser 24 and two positioning mirrors 26 and 28. Mirror 26 controls the vertical angle of the beam generated by laser 24 (i.e. its elevation) while mirror 28 controls the horizontal angle of the beam (i.e. its azimuth). The two mirrors are also controlled by the control panel 18. As shown in FIG. 1 laser beam 30 forms a laser spot within the field of view 20. The laser spot is used as a relative fiducial or reference and its exact position must be known before hand. Therefore before the system is used, the laser mirrors 26, 28 are calibrated as follows.

Figure 2:
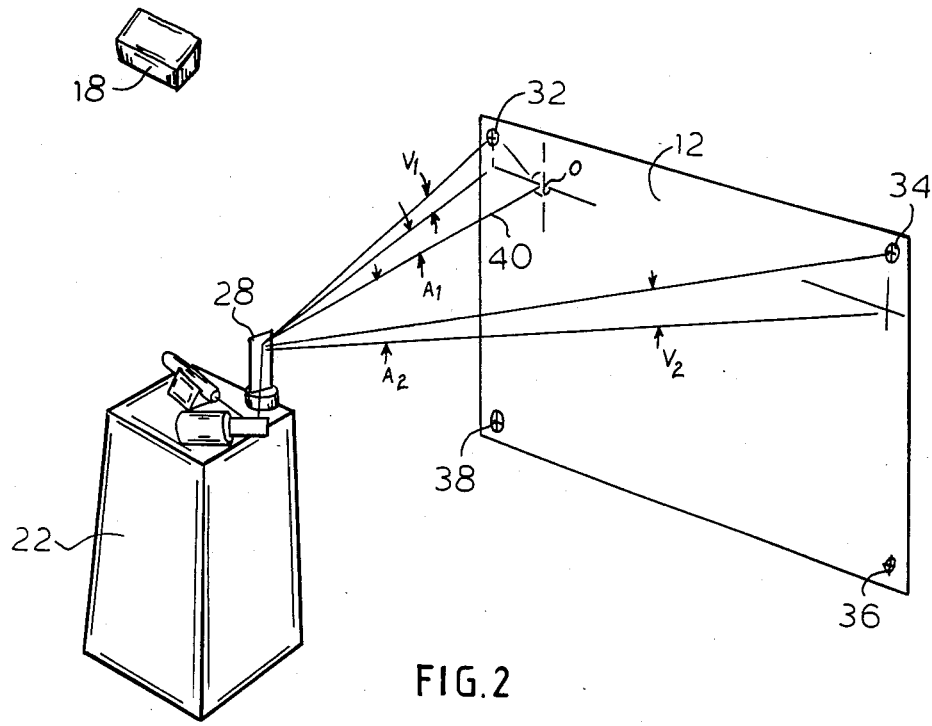
FIG. 2 shows how the apparatus of FIG. 1 is calibrated.

After the surface 12, pedestal 22 and robot 16 are securely mounted, a self-calibration is performed. For this purpose, the frame is provided with a plurality of targets 32, 34, 36 and 38 positioned very precisely on the frame. A movable, two dimensional target is also used. The targets may comprise, for example, a plurality of two-dimensional photosensors such as the Hamamatsu PSD 1200. Alternatively, the targets may be high resolution charged coupled device (CCD) sensor arrays. Each target is coupled to control panel 18. The baseline, 40, of the laser beam is found just by interactively positioning the movable target within, and parallel with, the frame. When equal changes of beam angle from a center location produces equal beam displacements on the target, along both axes, then the baseline, 40, is the center location. The laser beam 30 is then directed at target 32 (as shown in FIG. 2) and the two mirror positions are finely adjusted to center the laser beam on the target. The azimuth angle $A_1$ and vertical angle $V_1$ are also determined with respect to a baseline 40, perpendicular to frame 12 which impinges the frame at 0, and a horizontal plane containing said line 40. Next the beam 30 is directed at a second target 34 and the corresponding angles $A_2$ and $V_2$ are determined with respect to the baseline 40. If the axes of mirrors 26, 28 and targets 32 and 34 coincide, $V_1$ is equal to $V_2$ and the length Z of baseline 40, may be determined by the equation:

$$Z = \frac{W}{(\tan A_2 - \tan A_1)},$$

where W is the spacing between targets 32 and 34. Otherwise the angles to target 36 are determined and Z is then calculated by using simple trigonometry. The results may be confirmed by using the angle measurements obtained by directing the laser beam to fourth target 38.

Thus, after the pedestal 22, robot 16 and frame 12 are securely positioned, the self-calibration steps described above determine the exact location of origin 0 and the length Z of baseline 40.

Figure 3:
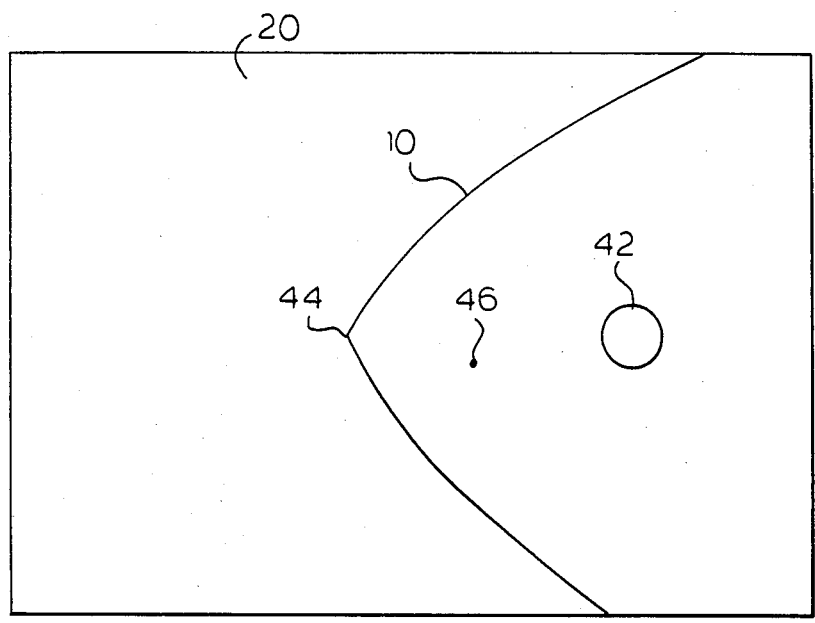
FIG. 3 shows the field of view of a video camera which is part of the apparatus of FIG. 1.

In FIG. 3, the field of view 20 is shown as seen by camera 14. In this field there is visible a portion of object 10. The object has one feature 42, one feature 44 and a laser spot 46 formed by laser beam 30 as described above. If the spot has diverged somewhat, camera 14 is equipped to determine its center. The position of key features of the light pattern such as the center of a spot in the field of view can be determined through image processing intensity, centroid processing, or any other suitable means. The position of point 46 with respect to 0 is easily determined from laser beam pointing angles A & V. For example, if mirrors 26 and 28 direct beam 30 at angles of $V_3$ and $A_3$ respectively, then $$X = Z \tan A_3$$

$$Y = Z \tan V_3$$

where X and Y are respectively the horizontal and vertical coordinates of point 46 with respect to 0.

From this information, the exact position of features 42 and 44 is easily derived by measuring the distance to point 46, for example, by counting the number of pixels in both the horizontal and vertical direction between the center of feature 42 and spot 46. The exact position of feature 42 is these resolved distances added to the X, Y position of spot 46.

Thus, the position of feature 42 or 44 are determined by projecting a known reference (spot 46) into the field of view 20, determining the relative difference between the feature and the reference, and adding this difference to the reference.

Figure 4:
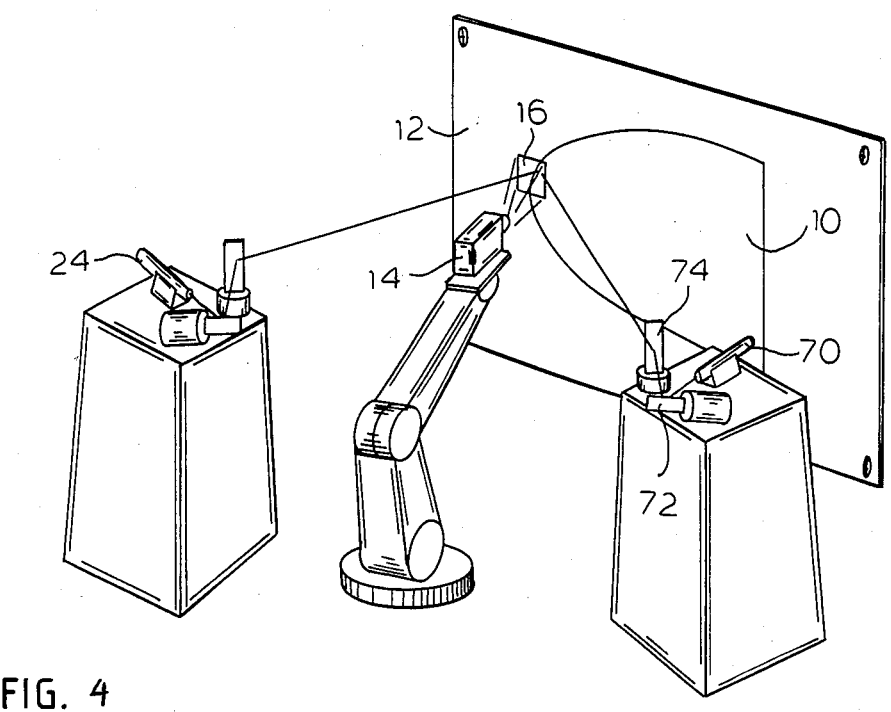
FIG. 4 shows an alternate embodiment of the invention.

Once the position of an object is determined with respect to frame 12, a work robot (not shown) remotely controlled from the control panel may be used to shift the object to a preselected location. Since the work robot may occlude the beam from the laser 24, a second laser 70 may be installed on the other side of camera 14 as shown in FIG. 4. Laser 70 with its mirrors 72, 74 is calibrated in the same way as laser 24, using the same targets so that a common reference frame is established for both lasers. With this configuration, the position of object 10 in frame 12 may be determined by using either laser 24 or 70.

Figure 5A:
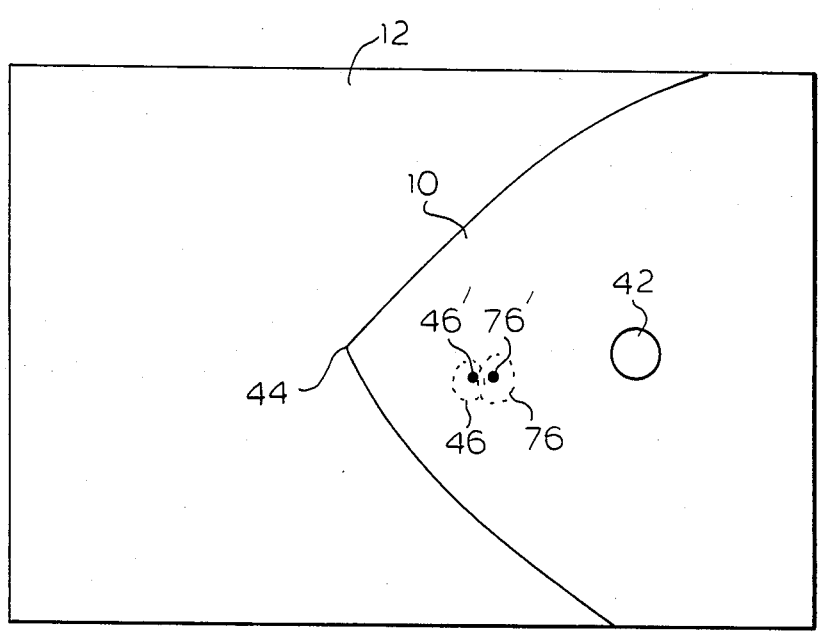
FIGS. 5A, 5B, 5C show the field of view for the camera of FIG. 4 with a relatively flat, a concave and a convex object respectively.

In addition, a two-laser system may also be used to determine variations in depth on object 10. During calibration the location of the spots are determined on the calibration surface 12. Conveniently, for example, the spots can be made to substantially coincide on such calibration surface 12. In such case when the surface of object 10 is in the same plane as the calibration surface, then the spots will also substantially coincide on the object 10, except for effects of random errors in the laser aiming system. This is illustrated in FIG. 5A which shows laser spot 46 from laser 24 and laser spot 76 from laser 70 and their centroids 46' and 76' all with only minimal separation.

Figure 5B:
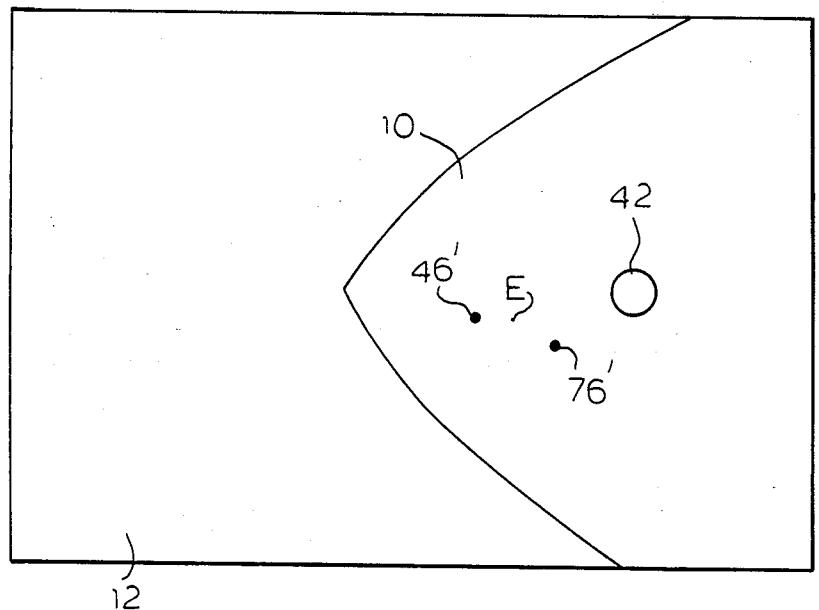
Figure 5C:
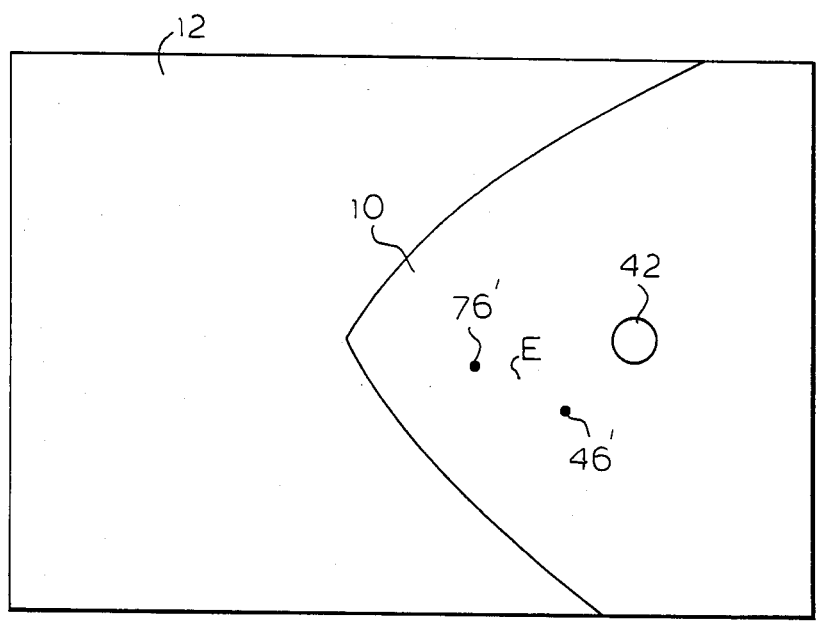

When in some areas the surface of object 10 is protruding beyond the calibration plane, the spots will separate, with the spot of the left laser moving to the left and the spot of the right laser moving to the right. This is illustrated in FIG. 5B. When the surface of object 10 is farther away from the calibration plane, then the laser spots will also separate, but in this case the spot from the left laser moves to the right and the spot from the right laser moves to the left, as illustrated in FIG. 5C.

The separation between the spots is proportional to the depth variations of the object 10. To identify the individual laser spots, one of the laser beams may be blocked momentarily. Using the methodology described above the profile of the object 10 can be mapped.

Obviously, numerous modifications may be made to the invention without departing from its scope as defined in the appended claims.

What is claimed is:

1. A method of determining the position of a feature on an object disposed in a frame comprising the steps of:
    directing an imaging device with a field of vision towards the feature;
    projecting a relative reference light pattern into the field of vision, said reference light pattern being disposed at a known location with respect to a fixed reference; and
    measuring the distance between said relative reference light pattern and said feature as indicated by said imaging device.

2. The method of claim 1 further comprising providing calibrating targets on said frame, for calibrating said reference light pattern.

3. A device for determining the position of a feature on an object comprising:
    a frame for holding the object;
    imaging means having a field of view;
    light pattern projecting means for projecting a pattern or spot to a known location on said field of view; and
    control means for directing said imaging means towards said field of view and simultaneously directing said light pattern projecting means to project said light pattern within said field of view;
    whereby the position of the feature with respect to the frame is determined by the position of the light pattern and the position of the feature relative to said light pattern.

4. The device of claim 3 wherein said imaging means comprises a video camera.

5. The device of claim 3 wherein said light pattern projecting means comprises a laser and means for directing the laser beam along two axes across the frame.

6. The device of claim 5 wherein the frame comprises a plurality of targets disposed at a preselected distance, and said control means is further provided to calibrate the laser by directing said laser beam to said targets.

7. The device of claim 6 wherein said targets comprise an array of photosensitive elements coupled to said control means said elements being activated by said light pattern when the laser beam is directed toward the corresponding target.

8. The device of claim 5 wherein said light pattern generating means comprises a second laser for generating a laser beam, and second means for directing said second laser beam toward said frame.

9. The device of claim 5 wherein said means for directing the laser beam comprises two mirrors for directing the beam in two orthogical directions.

10. The device of claim 5, wherein said means for directing the laser beam comprises one mirror mounted on two orthogonal axes for directing the beam in two orthogical directions.

* * * * *